UNITED STATES PATENT OFFICE.

GEORGE W. HATFIELD, OF DAYTON, OHIO.

IMPROVEMENT IN THE MANUFACTURE OF PUTTY.

Specification forming part of Letters Patent No. 96,231, dated October 26, 1869; reissue No. 6,161, dated December 8, 1874; reissue No. 6,360, dated March 30, 1875; application filed February 1, 1875.

*To all whom it may concern:*

Be it known that I, GEORGE W. HATFIELD, of Dayton, in the county of Montgomery, State of Ohio, did invent certain new and useful Improvements in the Manufacture of Putty, for which Letters Patent No. 96,231 were issued to me upon the 26th day of October, 1869, and thereafter duly surrendered, and reissued bearing date of December 8, 1874, and numbered 6,161, which reissued Letters Patent have been found defective, in that the specification and claims do not cover and embrace all of the original invention as set forth in the application filed in the Patent Office on the 21st day of April, 1869. Now, therefore, being desirous of reissuing said reissued Letters Patent herewith surrendered, I have prepared and do hereby declare that the following is a full, clear, and exact description of the said invention.

Heretofore, in the manufacture of putty, marble-dust and whiting have been combined, in equal proportions, with linseed-oil, the result being a marked improvement in the quality of the product, and in sections of country where marble is abundant and cheap a decrease in the cost of said product.

In sections remote from marble-quarries the cost of the marble-dust and the difficulties experienced in procuring the same have rendered its use impracticable, and in such cases where other ingredients have been employed in its place they were of a character to decrease, rather than increase, the value of the putty. To obviate this difficulty, and produce an article superior in quality and at a less cost, is the design of my invention, which consists, as a new article of manufacture, of putty composed, in part, of pulverized limestone, substantially as and for the purpose hereinafter specified.

In the manufacture of my putty the relative proportion of parts may be varied to suit the wishes of the manufacturer, the character or quality of the ingredients employed, or the degree of exposure to which the putty is to be subjected; but I preferably combine said ingredients in the following proportions, viz., forty-five parts of pulverized limestone, forty-five parts of whiting, and ten parts, by weight, of linseed-oil, which are mixed together and worked until thoroughly incorporated.

By the substitution of pulverized limestone for marble-dust I produce a cheaper article, as the first-named ingredient is found in nearly every section of the country, while marble-dust is scarce, and requires generally to be transported long distances. I further lessen the cost of the putty, as less oil is required to incorporate the pulverized limestone and whiting, and less time and labor to work the same, while the product is better, in that it remains plastic for a longer period while in bulk, and yet hardens as quickly when exposed to the air after being used as does the putty ordinarily employed.

I desire to be understood as distinctly disclaiming the use of marble-dust in the composition of putty.

Having thus fully set forth the nature and merits of my invention, what I claim is—

As a new article of manufacture, putty composed, in part, of pulverized limestone, substantially as and for the purpose specified.

In testimony whereof I have hereunto set my hand this 28th day of January, 1875.

GEO. W. HATFIELD.

Witnesses:
M. S. HOLDEN,
CHAS. C. HATFIELD.